United States Patent
Kshirsagar et al.

(10) Patent No.: US 9,590,954 B2
(45) Date of Patent: Mar. 7, 2017

(54) TRANSFERRING ENCRYPTED AND UNENCRYPTED DATA BETWEEN PROCESSING DEVICES

(71) Applicant: AT&T Intellectual Property I, L.P., Atlanta, GA (US)

(72) Inventors: Madhukar M. Kshirsagar, Morganville, NJ (US); Ajay Joshi, Manalapan, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 14/815,498

(22) Filed: Jul. 31, 2015

(65) Prior Publication Data
US 2015/0341324 A1 Nov. 26, 2015

Related U.S. Application Data

(63) Continuation of application No. 12/400,913, filed on Mar. 10, 2009, now Pat. No. 9,106,617.

(51) Int. Cl.
*H04L 29/06* (2006.01)
(52) U.S. Cl.
CPC ...... *H04L 63/0428* (2013.01); *H04L 63/0435* (2013.01); *H04L 63/08* (2013.01); *H04L 63/12* (2013.01)
(58) Field of Classification Search
CPC . H04L 63/0428; H04L 63/0435; H04L 63/08; H04L 63/12
See application file for complete search history.

(56) References Cited

U.S. PATENT DOCUMENTS

| | | |
|---|---|---|
| 6,813,711 B1 | 11/2004 | Dimenstein |
| 2002/0138747 A1 | 9/2002 | Clarke |
| 2003/0231767 A1 | 12/2003 | Carbajal |
| 2004/0193871 A1 | 9/2004 | Seshadri |

(Continued)

OTHER PUBLICATIONS

SSH Authentication: A Basic Overview; @ Articles; Oct. 19, 2003; accessed at http://neworder.box.sk/newsread.phy?newsid=9594 on Mar. 10, 2009 (7 pages).

(Continued)

*Primary Examiner* — Robert Leung
(74) *Attorney, Agent, or Firm* — Hanley, Flight & Zimmerman, LLC (57) ABSTRACT

Methods, apparatus and computer readable media for transferring encrypted and unencrypted data between processing devices are disclosed. Example data transmission methods disclosed herein include dividing, at a first processing device, a set of data collected at the first processing device into a first unencrypted data subset and a second unencrypted data subset. Disclosed example methods also include encrypting, at the first processing device, the first unencrypted data subset using an encryption key provided by a second processing device to generate a first encrypted data subset. Disclosed example methods further include transmitting the second unencrypted data subset from the first processing device to the second processing device before transmitting the first encrypted data subset from the first processing device to the second processing device to thereby transmit the set of data from the first processing device to the second processing device.

18 Claims, 5 Drawing Sheets

(56) References Cited

U.S. PATENT DOCUMENTS

| | | |
|---|---|---|
| 2005/0131902 A1* | 6/2005 | Saika ................ G06F 17/30067 |
| 2007/0022475 A1 | 1/2007 | Rossi et al. |
| 2007/0064935 A1 | 3/2007 | Ben-Yehuda |
| 2007/0076882 A1* | 4/2007 | Engel ................ H04L 63/0457 380/255 |
| 2007/0165440 A1 | 7/2007 | Hirai et al. |
| 2007/0220589 A1 | 9/2007 | Salowey et al. |
| 2008/0101598 A1 | 5/2008 | Dillaway |
| 2008/0253566 A1* | 10/2008 | Hidaka ................ H04L 9/0827 380/255 |
| 2009/0168650 A1 | 7/2009 | Kesselman |
| 2009/0210546 A1 | 8/2009 | Gindentuller et al. |
| 2010/0124329 A1 | 5/2010 | Lyman |
| 2010/0235635 A1 | 9/2010 | Kshirsagar et al. |

OTHER PUBLICATIONS

Blog Thread; Re: ssh without encryption; List: secure-shell; from Peter Daum; dated Sep. 29, 2007; accessed at http://mar.info/?l=secure-shell&m=119125216407725&w=2 on Mar. 12, 2009 (1 page).

Blog Thread, SSH Null Cipher? Yes, please!, dated Mar. 11, 2007; accessed at http://blog.vodkamelone.de/archives/129-SSH-Null-Cipher-Yes.-please!.html on Mar. 12, 2009 (1 page).

United States Patent and Trademark Office, "Non-Final Office Action", issued in connection with U.S. Appl. No. 12/400,913, dated Oct. 14, 2011 (14 pages).

United States Patent and Trademark Office, "Non-Final Office Action", issued in connection with U.S. Appl. No. 12/400,913, dated Apr. 27, 2012 (12 pages).

United States Patent and Trademark Office, "Final Office Action", issued in connection with U.S. Appl. No. 12/400,913, dated Sep. 19, 2012 (15 pages).

United States Patent and Trademark Office, "Non-Final Office Action", issued in connection with U.S. Appl. No. 12/400,913, dated Sep. 20, 2013 (13 pages).

United States Patent and Trademark Office, "Final Office Action", issued in connection with U.S. Appl. No. 12/400,913, dated Dec. 27, 2013 (15 pages).

United States Patent and Trademark Office, "Non-Final Office Action", issued in connection with U.S. Appl. No. 12/400,913, dated Aug. 26, 2014 (17 pages).

United States Patent and Trademark Office, "Final Office Action", issued in connection with U.S. Appl. No. 12/400,913, dated Jan. 30, 2015 (16 pages).

United States Patent and Trademark Office, "Notice of Allowance", issued in connection with U.S. Appl. No. 12/400,913, dated Apr. 2, 2015 (10 pages).

* cited by examiner

TRANSFERRING ENCRYPTED AND UNENCRYPTED DATA BETWEEN PROCESSING DEVICES

RELATED APPLICATION(S)

This patent arises from a continuation of U.S. patent application Ser. No. 12/400,913 (now U.S. Pat. No. 9,106,617), which is entitled "METHODS, SYSTEMS AND COMPUTER PROGRAM PRODUCTS FOR AUTHENTICATING COMPUTER PROCESSING DEVICES AND TRANSFERRING BOTH ENCRYPTED AND UNENCRYPTED DATA THEREBETWEEN," and which was filed on Mar. 10, 2009. U.S. patent application Ser. No. 12/400,913 is hereby incorporated by reference in its entirety.

FIELD OF THE DISCLOSURE

This disclosure generally relates to data communication and, more particularly, to methods, systems and computer program products for the authentication of processing devices and the transfer of data therebetween.

BACKGROUND

Communications that are carried out over a network such as the Internet may be vulnerable to tampering, message forgery, eavesdropping and the like. Secure Shell ("SSH") is a well-known family of communications protocols that may be used to establish a secure communications link between a pair of computer processing devices such as, for example, a server and a client computer or a pair of servers. The SSH protocols are most commonly used for communications over the Internet, but may be used for communications over any public or private network and, in particular, over networks in which messages are vulnerable to eavesdropping or may otherwise be compromised. The SSH protocols use public and private keys to allow first and second processing devices to authenticate each other without using passwords or otherwise exchanging information in advance. Once authentication is completed, users that are logged onto the first and second processing devices can exchange data over a secure, encrypted communications link. As the SSH protocols can be configured in a way that does not require passwords (which must be stored in, for example, application scripts on at least one of the processing devices), they tend to be more secure than other communications protocols such as the File Transfer Protocol ("FTP"), as stored passwords may not be updated with sufficient frequency and/or may be vulnerable to hacking.

There are at least two known methods for establishing trust between the users of two different systems without the use of passwords. The first such mechanism involves the use of authorized keys. The second mechanism involves the use of certificates that are submitted by the client. Both approaches avoid keeping passwords in application scripts and likewise avoid transmission of password information.

SUMMARY

Methods for transferring a set of data from a first processing device to a second processing device are provided. Pursuant to these methods an SSH authentication is performed to authenticate a first user that is logged onto the first processing device to a second user that is logged onto the second processing device. The set of data is divided into a first data subset and a second data subset. The first data subset is encrypted to provide an encrypted data set. The encrypted data set is transferred from the first processing device to the second processing device. The second data subset is also transferred from the first processing device to the second processing device, but without encrypting the second data subset.

In some embodiments, the second data subset may be data that is forwarded to the first processing device as unencrypted data. Moreover, the data set may be transferred from the first processing device to the second processing device without any exchange of passwords. The first data subset may be data that sets up transfer of the files from the first processing device to the second processing device, and the second data subset may be the files themselves. Additionally, the first user may selectively determine, for at least some of the set of data, which data is part of the first data subset and which data is part of the second data subset.

Pursuant to further embodiments, data processing devices are provided that include a data collection unit that receives raw data from an external monitoring system. These systems also include a data transfer unit that generates control information to transfer the received raw data to a second processing device. The systems also include an authentication unit that authenticates the data processing device to the second data processing device using an SSH authentication protocol and an encryption unit that encrypts the control information. Finally, the systems include a transmitter that transmits the received data and the control information to the second processing device, where at least some of the received data is transferred without encryption. Related computer program products are also provided.

Other systems, methods and/or computer program products according to other embodiments will be or become apparent to one with skill in the art upon review of the following drawings and detailed description. It is intended that all such additional systems, methods, and/or computer program products be included within this description and be protected by the accompanying claims.

DETAILED DESCRIPTION

Methods of transferring both encrypted and unencrypted data from a first computer processing device to a second computer processing device using SSH authentication, and related systems and computer program products, will now be described more fully hereinafter with reference to the accompanying drawings, in which illustrative embodiments are shown. However, it will be appreciated that these methods, systems and computer program products may be embodied in many different forms, and thus the present application should not be construed as limited to the embodiments set forth herein. Rather, these embodiments are provided so that this disclosure will be thorough and complete.

It will be understood that when an element is referred to as being "coupled", "connected" or "responsive" to another element, it can be directly coupled, connected or responsive to the other element or intervening elements may also be present. In contrast, when an element is referred to as being "directly coupled", "directly connected" or "directly responsive" to another element, there are no intervening elements present. Like numbers refer to like elements throughout. As used herein the term "and/or" includes any and all combinations of one or more of the associated listed items.

It will also be understood that, although the terms first, second, etc. may be used herein to describe various elements, these elements should not be limited by these terms. These terms are only used to distinguish one element from another element.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art in light of the present disclosure, and will not be interpreted in an idealized or overly formal sense unless expressly so defined herein.

The present disclosure includes block diagrams and flowcharts of methods, systems and computer program products according to various embodiments. It will be understood that a block of the block diagrams or flowcharts, and combinations of blocks in the block diagrams or flowcharts, may be implemented at least in part by computer program instructions. These computer program instructions may be provided to one or more enterprise, application, personal, pervasive and/or embedded computer processing devices/systems, such that the instructions, which execute via the computer system(s) create means, modules, devices or methods for implementing the functions/acts specified in the block diagram block or blocks. The computer program discussed in such embodiments comprises a computer usable storage medium having computer-readable program code embodied therein. Combinations of general purpose computer systems and/or special purpose hardware also may be used in other embodiments.

These computer program instructions may also be stored in memory of the computer system(s) that can direct the computer system(s) to function in a particular manner, such that the instructions stored in the memory produce an article of manufacture including computer-readable program code which implements the functions/acts specified in block or blocks. The computer program instructions may also be loaded into the computer system(s) to cause a series of operational steps to be performed by the computer system(s) to produce a computer implemented process such that the instructions which execute on the processor provide steps for implementing the functions/acts specified in the block or blocks. Accordingly, a given block or blocks of the block diagrams and/or flowcharts provides support for methods, computer program products and/or systems.

It should also be noted that in some alternate implementations, the operations noted in the flowcharts may occur out of the order illustrated in the flowcharts. For example, two blocks shown in succession may in fact be executed substantially concurrently or the blocks may sometimes be executed in the reverse order, depending upon the functionality/acts involved. Likewise, the functionality of one or more blocks of either the flowcharts or the block diagrams may, in other embodiments, be separated and/or combined with that of other blocks.

Figure 1:
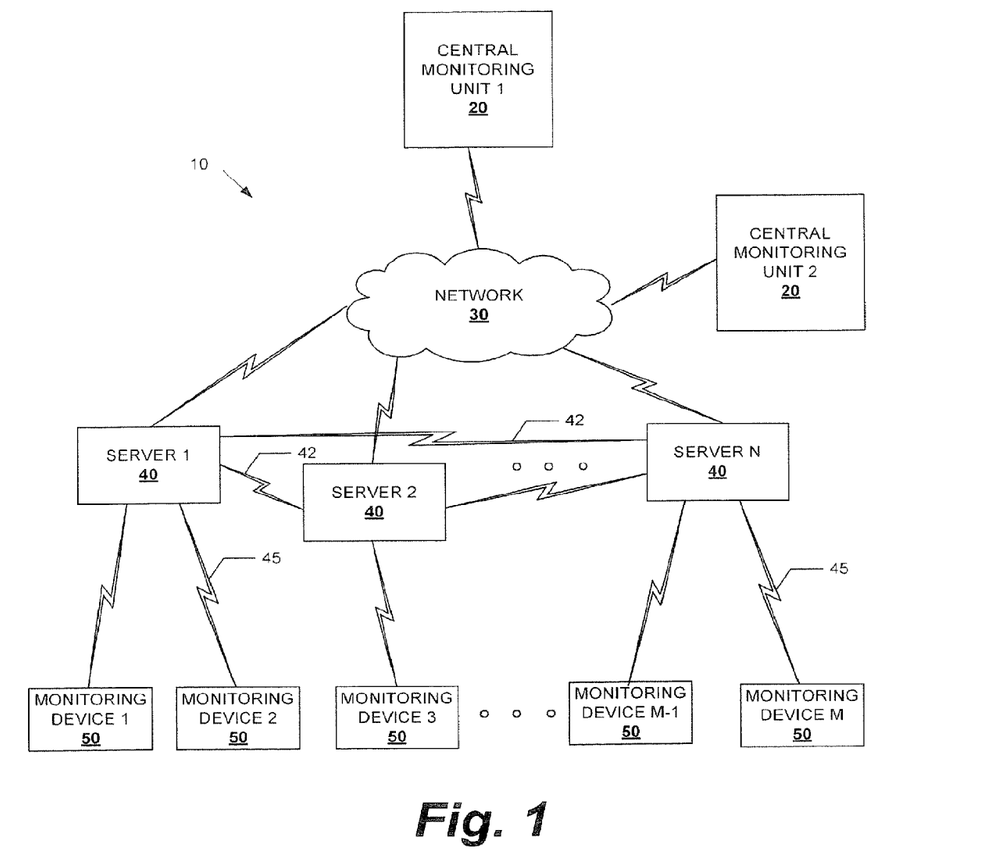
FIG. 1 is a block diagram of a performance monitoring system in which the methods, systems and computer program products described herein may be used.

FIG. 1 is a block diagram of a performance monitoring system 10 in which the methods, systems and computer program products described herein can be used. As shown in FIG. 1, one or more central monitoring units 20 (two central monitoring units 20 are shown in the exemplary system of FIG. 1) collect data from a plurality servers 40 (Server 1 through Server N) via a network 30 which may comprise, for example, the Internet or the combination of the Internet and other public and/or private networks. Each of the servers 40 either includes, or is in communication with, one or more of a plurality of monitoring devices 50 (Monitoring Device 1 through Monitoring Device M) via respective communications links 45. The communications links 45 may be networked or non-networked communications links.

The central monitoring units 20 may each be a single server, mainframe computer or the like, may comprise a plurality of co-located servers or other processing devices, or multiple servers or other processing devices that are geographically distributed but interconnected via one or more communications networks. It should also be noted that herein, the term "processing device" is used to broadly refer to any computer, computer system, server, computer processing device and/or data processing device.

The servers 40 collect data from their associated monitoring devices 50 via the communications links 45 (note that the communications links 45 may be hard-wired connections or even a data transfer bus with a server 40 in situations where the monitoring device 50 is co-located with, or part of, a server 40). In some embodiments, the servers 40 may collect large amounts of data. Some or all of the data may be transferred from the monitoring devices 50 to the servers 40 over unencrypted communications links and/or over less secure encrypted communications links such as communications links that use the FTP protocol or other password based protocols.

The servers 40 aggregate the data obtained from the monitoring devices 50. In some cases, the servers 40 may also process the raw data. The raw and/or processed data may then be transferred from each server 40 to the central monitoring units 20 over the network(s) 30. The servers 40 may comprise any type of computer processing device. The servers 40 may also exchange data with each other over communications links 42 (which may be networked or non-networked communications links).

The monitoring devices 50 may be remote from the servers 40, co-located with the servers 40 and/or may be part of the servers 40. The monitoring devices 50 may be hardwired to their respective servers 40 or may be connected to the servers 40 over a wired and/or wireless network. Some of the monitoring devices 50 may be in communication with multiple of the servers 40.

In an exemplary embodiment, the central monitoring units 20 together may comprise a telecommunications monitoring system that collects performance data for one or more telecommunications networks. An example of such a system is the Performance Monitoring Operation Support System ("PMOSS") that may be used to monitor the performance of telecommunications networks. In an exemplary embodiment, the PMOSS system includes nearly 200 servers that collect network performance data and exchange that data between the servers 40 and/or transfer data to one or more of a half dozen or so central monitoring units 20. PMOSS uses a data distribution bus staging system for movement of data between the servers 40 and/or to the central monitoring units 20. The servers 40 transfer data at frequencies of, for example, every 5 minutes, every 15 minutes or once an hour. As a result, gigabytes of data are transferred within PMOSS every hour. The SSH protocol may be used to transfer data in the PMOSS system. Most of the raw network performance data reaches the servers 40 PMOSS over non-secure communications links or over lower security communications links (i.e., via FTP or via SNMP data collection).

The use of encrypted SSH protocol communications links may strain the computer processing units ("CPUs") of the devices exchanging data when large amounts of data are being transferred, due to the CPU resources required to perform SSH encryption and decryption on the transferred data. Accordingly, herein, methods, systems and computer program products are provided that use SSH authentication, and which selectively transfer a subset of the data as encrypted data, while transferring the remaining data without encryption in order to reduce the CPU resources required to perform the data transfer. The methods, systems and computer program products disclosed herein may be very secure due to the use of the SSH authentication procedures, which do not use passwords. These methods, systems and computer program products also allow important and/or sensitive information to be transferred as encrypted data, while less sensitive data (which, in many cases, may be the bulk of the data), may be transferred without encryption, thereby significantly reducing the CPU resources required to perform the data transfer.

While FIG. 1 illustrates an exemplary performance monitoring system in which the methods, systems and computer program products that are discussed herein may be used, it will be appreciated that these methods, systems and computer program products may be used in any environment where data transfer takes place between two processing devices over a network connection.

Figure 2:
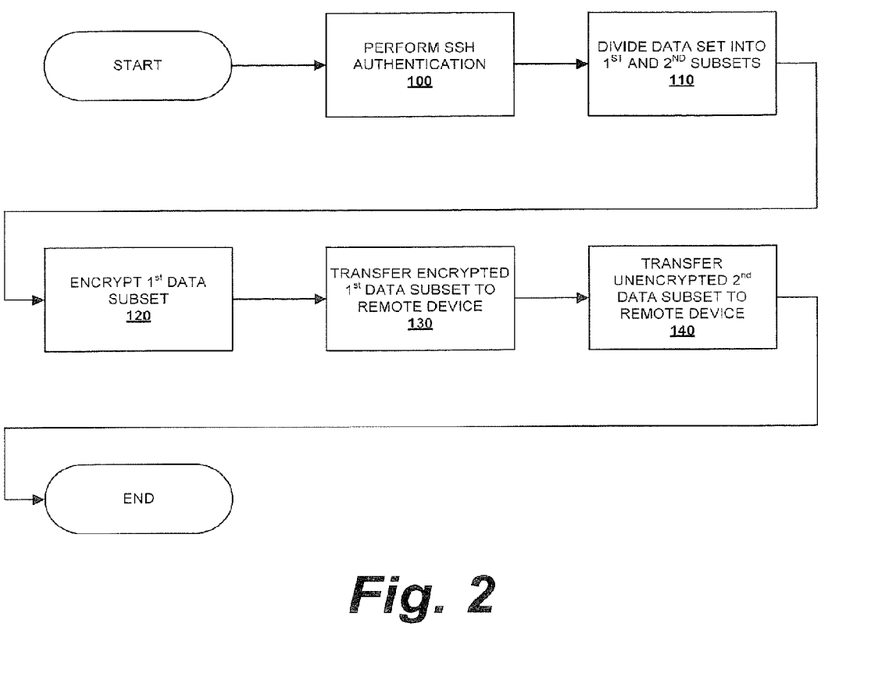
FIG. 2 is a flowchart of a method of transferring a set of data from a first processing device to a second processing device according to an exemplary embodiment.

FIG. 2 is a flow chart illustrating methods, systems and computer program products for transferring a set of data from a first processing device to a second processing device according to certain embodiments. As shown in FIG. 2, first, an SSH authentication may be performed (block 100). The SSH authentication may be used, for example, to authenticate a first user that is logged onto a first processing device to a second user that is logged onto a second processing device. Alternatively, the SSH authentication may involve authenticating both the first user to the second user as well as the second user to the first user. Herein, the term "user" refers to the entity that is logged onto a particular processing device or that has otherwise coordinated the actions of the processing device (as would occur, for example, with automated processes).

Either before or after authentication is completed, the first processing device may divide the data that is to be transferred into at least two subsets, namely a first subset of data that will be transferred as encrypted data and a second subset of data that will be transferred without encryption (block 110). In some embodiments, the only data that is encrypted is control information such as file names, file header information and file size information that is used to set up the file transfer. In other embodiments, some of the actual data (e.g., the files themselves) is encrypted along with the control information, while the remainder of the data is transferred without encryption. The control information may be encrypted, although it need not be in some embodiments.

The first subset of data is encrypted, using an encryption key that was exchanged by the first and second processing devices during the SSH authentication procedure of block 100 that was used to set up of the SSH session. By this encryption process, the first data subset is transformed into an encrypted first data subset (block 120). Next, the first processing device transfers the encrypted first data subset to the second processing device (block 130). Then, the first processing device transfers the second subset of data to the second processing device without encryption (block 140).

It will be appreciated that the operations shown in FIG. 2 need not be performed in the particular order shown. By way of example, the operations of block 110 (dividing the data into first and second subsets) may be performed before the SSH authentication operations of block 100. Likewise, in some embodiments, at least some of the second subset of data may be transferred to the first processing device (block 140) before the encrypted first data subset is transferred (block 130). Thus, it will be appreciated that the flow chart of FIG. 2 illustrates one exemplary embodiment, but is not intended to be limiting.

In some embodiments of the method of FIG. 2, the second data subset may include data that was forwarded to the first processing device over a network as unencrypted data. As this data has already been transmitted across a network without encryption, it has already been exposed to possible tampering, and hence exposing such data to tampering a second time does not tend to pose an excessive risk. So long as any subsequent communications links that the data is to be transmitted over have the same or better physical layer security as the links that the data was already transmitted over without encryption, then the data can be transmitted over such subsequent communications links without a significant reduction in security. By way of example, the data transferred in the PMOSS system discussed above with respect to FIG. 1 is transferred from the monitoring devices 50 to the servers 40 via an Intranet network, often without encryption. The data may also be transferred from the servers 40 to the central monitoring units 20 over the same Intranet network. As such, no particular advantage or increase in security is obtained by encrypting the data when it is sent from the servers 40 to the central monitoring units 20. Moreover, by transferring such data without encryption, the computer processing resources required for the transfer may be reduced to, for example, less than 20% of the resources that would otherwise be required were the data to be transferred with encryption. Thus, by identifying less important data and/or data that is less vulnerable to tampering, and then transferring such data without encryption, the computer processing resources required to transfer data may be significantly reduced, while the computer processing devices are still authenticated to each other using highly secure SSH authentication.

In some embodiments, the data may be transferred between the processing devices without any exchange of passwords between the processing devices. As noted above, password based authentication systems may be vulnerable to hacking and other attacks.

As will be discussed in greater detail below, the subset of the data that is transferred with encryption may include control information that is used to set up the file transfer. This control information may include, for example, the names of the files to be transferred, the size of each file to be transferred, file header information and the like. Additionally, the subset of the data that is encrypted may also include raw or processed data files that require highly secure transfer techniques. A user may designate the files that are encrypted versus the ones that are not encrypted or, alternatively, a program on one of the two processing devices may automatically make this determination based on predetermined criteria. By way of example, certain types of raw and/or processed data that is periodically generated may always be transferred with encryption, while other types may always be transferred without encryption.

Figure 3:
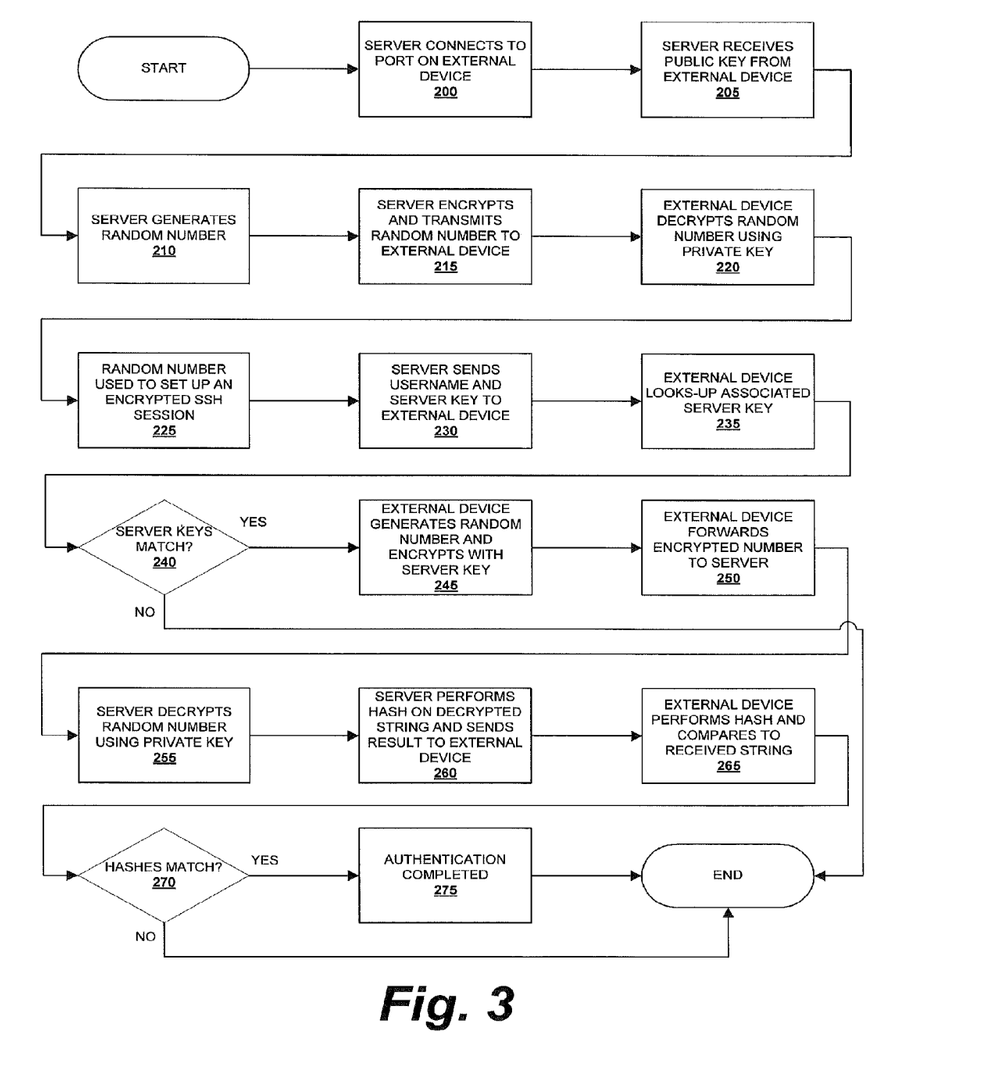
FIG. 3 is a flowchart illustrating a method that may be used to authenticate a first processing device to a second processing device according to an exemplary embodiment.

FIG. 3 is a flowchart illustrating methods, systems and computer program products that may be used to authenticate a first processing device to a second processing device. By way of example, the operations of FIG. 3 may be used to authenticate one of the servers 40 of FIG. 1 to an external device such as the central monitoring unit 20 of FIG. 1 (i.e., to perform the SSH authentication operation of block 100 of FIG. 2). As shown in FIG. 3, operations may begin with the server 40 connecting to an input/output port on the central monitoring unit 20 (block 200). The central monitoring unit 20 may send at least one public key to the server 40 (block 205). The public key is a first portion of a public/private key that is used by the central monitoring unit 20. The server 40 then generates a random number such as a 10-digit random number (block 210). The server 40 then encrypts this random number using the public key received from the central monitoring unit 20, and sends the encrypted random number to the central monitoring unit 20 (block 215). The central monitoring unit 20 then decrypts the received encrypted random number using the second or "private" portion of the public/private key (block 220) so that both the central monitoring unit 20 and the server 40 have a shared secret that is not known to anyone else, namely the random number generated by server 40 (no one else can decrypt the random number since only the central monitoring unit 20 has the private portion of the public/private key). This random number is then used to set up an encrypted SSH session between the central monitoring unit 20 and the server 40 (block 225).

Once the encrypted SSH session is set up, user authentication then occurs. In some embodiments, this may involve the server 40 sending its username and its public key (herein the "server key") to the central monitoring unit 20 (block 230). The central monitoring unit 20 checks its authorized key file for the username sent by the server 40 to obtain an associated server key (block 235). The central monitoring unit 20 then checks to see if the server key in its key file matches the received server key (block 240). If not, operations end. If the keys match, then the central monitoring unit 20 generates a random number and encrypts it with the server key (block 245). The central monitoring unit 20 forwards this encrypted string to the server 40 (block 250). The server 40 then uses its associated private key to decrypt the received string (block 255). The server 40 performs a hash on the decrypted string, and sends the result to the central monitoring unit 20 (block 260). The central monitoring unit 20 then matches the string received from the server 40 to a hash of the random number (block 265). If there is a match (block 270), the server 40 has been authenticated to the central monitoring unit 20 (block 275).

While FIG. 3 illustrates one possible series of operations for performing the authentication, it will be appreciated that the process differs depending upon the version of the SSH protocol used, and hence other authentication operations may be used in other embodiments to perform the authentication of block 100 of FIG. 2.

Turning again to FIG. 2, it can be seen that block 110 involves dividing the data into first and second subsets. In some embodiments, much of the data that is to be transferred from, for example, one of the servers 40 of FIG. 1 to the central monitoring unit 20 or between two of the servers 40 of FIG. 1 may be large volumes of performance monitoring data. The integrity of this data may be relatively low risk from a security viewpoint. Moreover, in many cases, the data that is transferred from the monitoring devices 50 to the servers 40 may be transferred over unsecured links. As such, the security integrity of the overall system may not be significantly compromised if this data is transferred from the servers 40 to the central monitoring unit 20 without encryption, as this data was already previously transmitted without encryption.

In some embodiments, the only data that is transmitted from the servers 40 to the central monitoring unit 20 without encryption is data that was transferred from a monitoring device 50 to one of the servers 40 without encryption. In other embodiments, all of the raw data may be transferred from the servers 40 to the central monitoring unit 20 (and/or between two of the servers 40) without encryption, and the only information exchanged between server 40 and the central monitoring unit 20 (and/or between two of the servers 40) that is encrypted is control information such as the instructions that are used to set up the file transfer. In still other embodiments, a user associated with the server 40 (or a program running on server 40) may selectively decide what data is and is not transferred to the central monitoring unit 20 or to another server 40 with encryption. Once the data is divided into the first and second subsets, the first subset may be encrypted and the first and second subsets may be transferred from the server 40 to the central monitoring unit 20 and/or to another of the servers 40.

Figure 4:
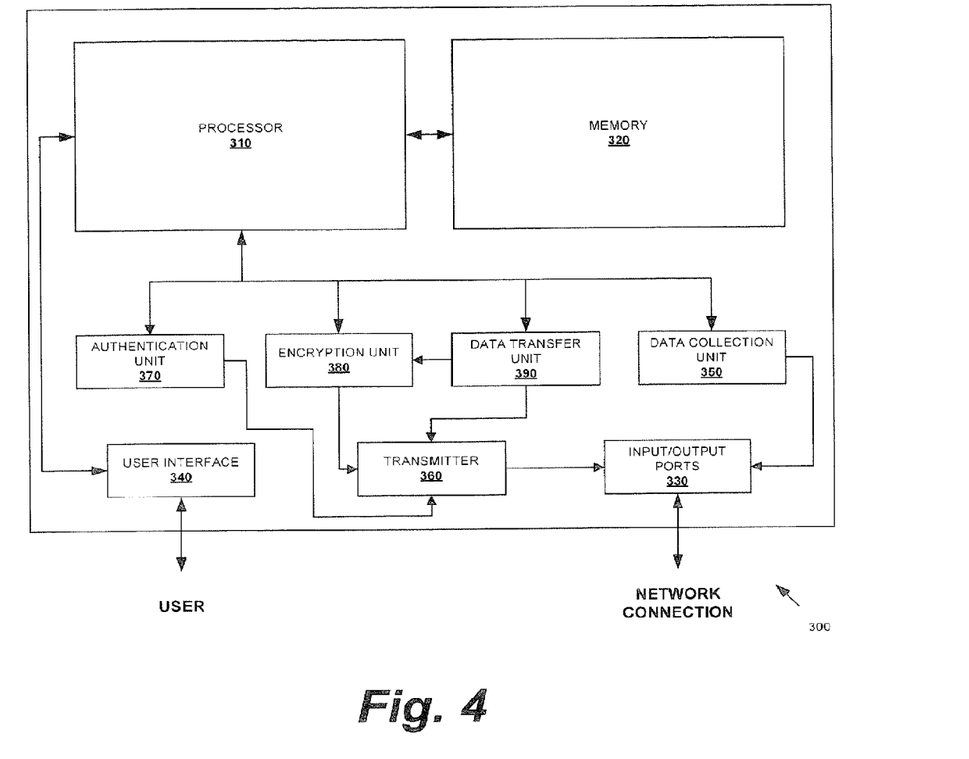
FIG. 4 is a block diagram of a system for transferring both encrypted and unencrypted data to a remote processing device using SSH authentication according to an exemplary embodiment.

FIG. 4 is a block diagram of a processing device 300 that is configured to transfer both encrypted and unencrypted data to a remote device using SSH authentication. As shown in FIG. 4, the processing device 300 comprises a processor 310 and a memory 320 that communicates with the processor 310. The processor 310 may be embodied as one or more enterprise, application, personal, pervasive and/or embedded computer systems and/or special purpose hardware that may be centralized and/or distributed and connected by a wired network and/or a wireless network. The memory 320 may represent an overall hierarchy of memory devices containing software and/or data including, but not limited to, the following types of memory devices: cache, ROM, PROM, EPROM, EEPROM, flash memory, SRAM, DRAM, removable and/or fixed media, as well as virtual storage. The memory 320 may also be centralized and/or distributed and connected by a wired network and/or a wireless network. The memory 320 may be at least partially embedded in the processor 310 or may be separate therefrom. The memory 320 may include software such as an operating system as well as data that has been collected for transfer to other external device(s). Additionally, as will be discussed in greater detail below, the memory may also include a variety of applications (e.g., an authentication application, an encryption application, etc.) which are shown as separate functional blocks in the block diagram of FIG. 4, as the functionality of these blocks may be implemented primarily as hardware, primarily as software or as a combination of hardware and software.

The data processing device 300 may further include a user interface 340 which may comprise, for example, a keyboard, mouse and display and/or any of a variety of other user input/output and/or display devices known in the art. The user interface 340 may be used, for example, for a user to log onto the processing device 300 and/or for the user to specify which files are to be encrypted. The user interface 340 may comprise a plurality of different devices.

As is also shown in FIG. 4, the processing device 300 further includes a data collection unit 350, a transmitter 360, an authentication unit 370, an encryption unit 380 and a data transfer unit 390. At least some of these units may comprise software that is stored in the memory 320 and which may run on the processor 310 in order to implement the described functionality of the unit. Further detail regarding each of these units will now be provided.

The data collection unit 350 comprises hardware and/or software that is configured to receive, or to collect and receive, data such as, for example, network performance data. In some embodiments, the data collection unit 350 may collect this data from one or more external monitoring units, while in other embodiments, the data processing device 300 itself may generate the performance data. In some embodiments, the data collection unit 350 may be a software application running on the processor 310 of processing device 300. As discussed above, the data collected by the data collection unit 350 is to be passed on to a second processing device such as, for example, the central monitoring unit 20 of FIG. 1. Much of the data collected by the data collection unit 350 may be collected from external monitoring units over network connections, where the data is transferred from the data monitoring units to the data collection unit 350 using either unencrypted communication sessions or sessions that use the file transfer protocol or other password-based protocols that may be vulnerable to hacking or other security threats.

The transmitter 360 may, for example, comprise a transmit task that is running on the processor 310 along with the appropriate ports and associated hardware on the processing device 300. The transmitter 360 may, for example, be configured to establish a remote SSH shell on another processing device to facilitate establishing an SSH session, as will be described in more detail below with respect to FIG. 5. The transmitter 360 is configured so that it can transmit both encrypted and unencrypted data to an external processing device.

The authentication unit 370 may comprise, for example, a software application that is configured to perform SSH authentication with an external processing device. The authentication unit 370 may, for example, perform each of the authentication related operations shown in FIG. 3 that are performed at the server 40, and/or perform other equivalent operations for alternative forms of SSH authentication.

The encryption unit 380 may comprise, for example, a software application that is configured to encrypt the control information and/or the portion of the data that is to be transferred using an SSH protocol encryption scheme. The encryption unit 380 may also be used to encrypt random numbers during the authentication process. In some embodiments, the encryption unit 380 and the authentication unit 370 may comprise an integrated software application that performs the functionality of both units.

The data transfer unit 390 may comprise, for example, a software application that is configured to generate control information for transferring the raw and/or processed data (e.g., data received from the external monitoring units) to the second processing device. This control information may comprise, for example, file headers, file names, file sizes and the like. The data transfer unit 390 and the transmitter 360 may be implemented together as an integrated package in some embodiments.

It will be appreciated that the functionality of the data collection unit 350, the transmitter 360, the authentication unit 370, the encryption unit 380 and the data transfer unit 390 may be embodied, at least in part, using discrete hardware components, one or more Application Specific Integrated Circuits (ASIC) and/or a special purpose digital processor. In other embodiments, these units may be implemented primarily or completely in software. It will also be understood by those having skill in the art that the processing system 300 may include many other components, such as data buses, controllers, operating systems, mass storage systems, etc., that are not illustrated in FIG. 3 for ease of explanation.

Figure 5:
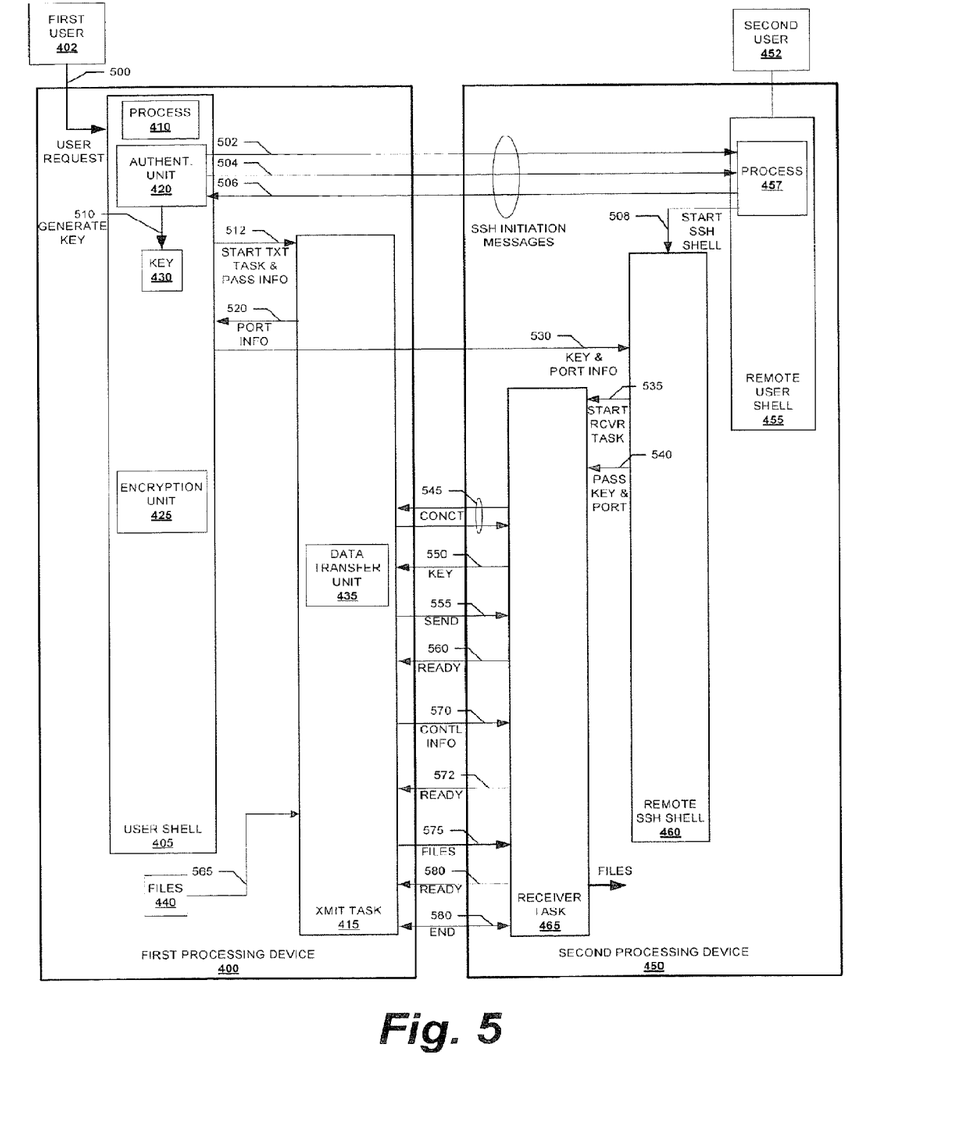
FIG. 5 is a message flow diagram illustrating methods of transferring both encrypted and unencrypted data between a pair of processing devices using SSH authentication according to an exemplary embodiment.

FIG. 5 is a message flow diagram illustrating the messages that may be passed to perform a transfer of data between first and second processing devices using SSH authentication, where only some of the data that is passed between the first and second processing devices is encrypted.

According to an exemplary embodiment, as shown in FIG. 5, a first user 402 that is logged onto the first processing device 400 has an associated first user shell 405 that runs on the first processing device 400. The first user may input a request 500 that one or more files 440 be transferred from the first processing device 400 to a second processing device 450. A second user 452 is logged onto the second processing device 450 so as to have a second user shell 455 running thereon. The request 500 may be a request that is automatically generated by a process 410 that is running under the user shell 405 on the first processing device 400 or may be a request that is manually input by the first user 402. It will also be understood that the first and/or second users may only be "logged onto" their respective first or second processing devices 400, 450 in the sense that these processing devices 400, 450 are programmed to automatically run certain processes that carry out the file transfers described herein.

To establish SSH connectivity between the first user shell 405 and the second user shell 455, an authentication unit/process 420 that is running on the first processing device 400 exchanges a series of messages (messages 502, 504, 506) with a process 457 that is running on the remote user shell 455 on second processing device 450. In response to this series of messages 502, 504, 506, the second processing device starts a remote SSH shell 460 (message 508). The remote SSH shell 460 is a process that runs on the second processing device 450 that is used to complete the SSH authentication process between the first and second user shells 405, 455 and to set up a receiver task 465 (described below) on the second processing device 450. Next, the authentication unit/process 420 that is running on the first processing device 400 generates a random number or "key" 430 (message 510), and then starts a transmit task 415 running on the first processing device 400 (message 512). At the same time, the user shell 405 may also pass the random key 430, the names of the files to be transferred and the destination directories for the files on the second processing device 450 to the transmit task 415 (message 512). The transmit task 415 selects an input/output port (not shown) on the first processing device 400 and passes the identifiers of the input/output ports back to the user shell 405 (message 520). The user shell 405 then waits for establishment of the connection to the remote SSH shell 455 on the second processing device 450.

Next, the authentication unit/process 420 uses the transmit task 415 to transmit the key 430 and the identifier of the input/output port to the remote SSH shell 460 (message 530).

The remote SSH shell 460 initiates the receiver task 465 on the second processing device 450 (message 535). Once the receiver task 465 is up and running, the remote SSH shell 460 passes the Internet Protocol ("IP") address of the first processing device 400, an identification of the selected input/output port, and the key 430 to the receiver task 465 (message 540). The receiver task 465 uses this information to establish a TCP/IP connection with the transmit task 415 on the selected port (message 545). The receiver task 465 then sends the key 430 back to the transmit task 415 (message 550). The transmit task 415 compares the received key 430 to the key that was originally sent to complete the authentication. If the keys match, the connection has been authenticated, and a "sending" message is transmitted from the transmit task 415 to the receiver task 465 along with a buffer size (message 555). If, instead, the keys do not match, the TCP/IP connection is terminated and the transmit task 415 is terminated. The user shell 405 detects this error and terminates the SSH session.

Next, the receiver task 465 sends a "ready" message to the transmit task 415 (message 560). The transmit task 415 also at some point receives one or more files 440 that are to be transferred from the process 410 running under user shell 405 (message 565). Then, the transmit task 415 sends control information for the first file that is to be transferred including, for example, the file name, file header information, destination directory information and the like to the receiver task 465 (message 570). This control information is generated by a data transfer unit 435 that may comprise, for example, an application running under the user shell 405 or a sub-routine of the transfer task 415 (which is how the data transfer unit 435 is depicted in FIG. 5). As noted above, typically this control information will be encrypted before it is transmitted from the first processing device 400 to the second processing device 450. The encryption may be performed, for example, by an encryption unit/encryption application 425 that is running under the user shell 405. In some embodiments, the encryption unit/application 425 may be part of the authentication unit/process 420. Once the control information has been sent, the receiver task 465 validates the information (e.g., makes user the destination directories exist) and then transmits a "ready" signal to the transmit task (message 572). If the information is not valid, an error message is sent instead as message 572 and the TCP/IP connection is terminated. The transmit task 415 then transfers a portion of the file that is less than or equal to the buffer size at the receiver task 465 and waits for a response (message 575). The receiver task 465 transfers the received information out of the buffer and sends a "ready" signal once it is ready to receive the next portion of the file (message 580). The steps associated with messages 575 and 580 are repeated until the complete file has been received by the receiver task 465, reconstructed and stored in the destination directory. The steps associated with messages 570, 572, 575 and 580 may then be repeated until all of the files 440 that are to be transmitted have been sent to the second processing device 450. At that point, one or more messages 580 may be exchanged between the transmit task 415 and the receiver task 465 to terminate the TCP/IP connection, and the transmit and receive tasks 415, 465 may then be broken down. As discussed above, some or all of these files 440 will be transmitted without encryption.

It will also be appreciated that the message transfer protocol that is described above can be modified to reverse the direction of data transfer.

Test data shows that using the methods, systems and computer program products disclosed herein may reduce CPU utilization by a factor of five or more as compared to file transfers that are performed using full SSH encryption/decryption. By way of example, tests performed in which a 321 megabyte file was transferred from a Solaris 8.0 server to a Linux server required 13.3 second of CPU utilization on the Solaris 8.0 server to complete the file transfer when the file was fully encrypted using SSH encryption. In contrast, when the same file transfer was performed using the methods disclosed herein (and with only the file header information encrypted), the file transfer took only 1.08 seconds of CPU utilization on the Solaris 8.0 server. Similarly, a transfer of the same 321 megabyte file from a Linux server to another Linux server required 9 seconds of CPU utilization on the sending server when full SSH encryption was used, versus only 0.82 seconds of CPU utilization when only the file header information was encrypted.

Thus, the methods, systems and computer program products disclosed herein allow use the highly secure SSH authentication protocols to authenticate two processing devices, while only selectively encrypting the data that is transferred between the two processing devices, thereby reducing the CPU resources required to complete the file transfer.

Multiple embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed various embodiments and, although specific terms are employed, they are used in a generic and descriptive sense only and not for purposes of limitation.

What is claimed is:

1. A data transmission method comprising:

dividing, at a first processing device, a set of network performance monitoring data collected at the first processing device from a remote monitoring device into a first unencrypted subset of the network performance monitoring data and a second unencrypted subset of the network performance monitoring data;

encrypting, at the first processing device, the first unencrypted subset of the network performance monitoring data and control information associated with the set of network performance monitoring data using an encryption key provided by a second processing device to generate a first encrypted data subset; and transmitting the second unencrypted subset of the network performance monitoring data from the first processing device to the second processing device before transmitting the first encrypted data subset from the first processing device to the second processing device.

2. The method of claim 1, wherein the control information specifies a destination for the second unencrypted data subset at the second processing device.

3. The method of claim 2, wherein the destination corresponds to a destination directory at the second processing device.

4. The method of claim 1, further including receiving the encryption key from the second processing device during an authentication procedure.

5. The method of claim 1, further including collecting the set of network performance monitoring data from a plurality of monitoring devices including the remote monitoring device.

6. The method of claim 1, further including:
identifying a portion of the set of network performance monitoring data that was received via a network without being encrypted; and
including the identified portion of the set of network performance monitoring data in the second unencrypted subset of the network performance monitoring data.

7. A computer readable storage device including computer readable instructions which, when executed, cause a first processing device to perform operations comprising:
dividing a set of network performance monitoring data collected at the first processing device from a remote monitoring device into a first unencrypted subset of the network performance monitoring data and a second unencrypted subset of the network performance monitoring data;
encrypting the first unencrypted subset of the network performance monitoring data and control information associated with the set of network performance monitoring data using an encryption key provided by a second processing device to generate a first encrypted data subset; and
transmitting the second unencrypted subset of the network performance monitoring data from the first processing device to the second processing device before transmitting the first encrypted data subset from the first processing device to the second processing device.

8. The computer readable storage device of claim 7, wherein the control information specifies a destination for the second unencrypted data subset at the second processing device.

9. The computer readable storage device of claim 8, wherein the destination corresponds to a destination directory at the second processing device.

10. The computer readable storage device of claim 7, wherein the operations further include receiving the encryption key from the second processing device during an authentication procedure.

11. The computer readable storage device of claim 7, wherein the operations further include collecting the set of network performance monitoring data from a plurality of monitoring devices including the remote monitoring device.

12. The computer readable storage device of claim 7, wherein the operations further include:
identifying a portion of the set of network performance monitoring data that was received via a network without being encrypted; and
including the identified portion of the set of network performance monitoring data in the second unencrypted subset of the network performance monitoring data.

13. A first processing device comprising:
memory including machine readable instructions; and
a processor to execute the machine readable instructions to perform operations including:
dividing a set of network performance monitoring data collected at the first processing device from a remote monitoring device into a first unencrypted subset of the network performance monitoring data and a second unencrypted subset of the network performance monitoring data;
encrypting the first unencrypted subset of the network performance monitoring data and control information associated with the set of network performance monitoring data using an encryption key provided by a second processing device to generate a first encrypted data subset; and
transmitting the second unencrypted subset of the network performance monitoring data from the first processing device to the second processing device before transmitting the first encrypted data subset from the first processing device to the second processing device.

14. The first processing device of claim 13, wherein the control information specifies a destination for the second unencrypted data subset at the second processing device.

15. The first processing device of claim 14, wherein the destination corresponds to a destination directory at the second processing device.

16. The first processing device of claim 13, wherein the operations further include receiving the encryption key from the second processing device during an authentication procedure.

17. The first processing device of claim 13, wherein the operations further include collecting the set of network performance monitoring data from a plurality of monitoring devices including the remote monitoring device.

18. The first processing device of claim 13, wherein the operations further include:
identifying a portion of the set of network performance monitoring data that was received via a network without being encrypted; and
including the identified portion of the set of network performance monitoring data in the second unencrypted subset of the network performance monitoring data.

* * * * *